United States Patent [19]

Nickoladze

[11] Patent Number: 4,487,455
[45] Date of Patent: Dec. 11, 1984

[54] WHEEL COVER RETAINING APPARATUS

[76] Inventor: Leo G. Nickoladze, 1155 Kahili St., Kailua, Hi. 96734

[21] Appl. No.: 498,770

[22] Filed: May 27, 1983

[51] Int. Cl.³ .............................. B60B 7/06; B60B 7/02
[52] U.S. Cl. ................................ 301/37 AT; 301/37 S; 301/37 SS
[58] Field of Search ............. 301/37 AT, 37 SS, 37 S, 301/108 S; 411/400

[56] References Cited

U.S. PATENT DOCUMENTS

| 2,614,001 | 10/1952 | Rycroft | 301/37 S |
| 2,722,460 | 11/1955 | Dieterich | 301/37 S |
| 4,090,744 | 5/1978 | McCanley | 301/37 AT |

FOREIGN PATENT DOCUMENTS

| 18241 | 5/1953 | Fed. Rep. of Germany | 301/37 SS |
| 1280816 | 7/1972 | United Kingdom | 411/400 |

Primary Examiner—David A. Scherbel
Attorney, Agent, or Firm—Flehr, Hohbach, Test, Albritton & Herbert

[57] ABSTRACT

A wheel cover and wheel cover attaching device retaining the wheel cover on a wheel having evenly distributed openings. The attaching devices include a plurality of brackets carried by and uniformly distributed about a flange formed at the edge margin of the cover and a plurality of both the threaded elements formed with a hook shaped portion at one end and a threaded portion formed at the other end. The threaded portion is fit through a hole in each bracket and the hook shaped portion is oriented to pass through the wheel openings and be held against the back side of the wheel when the threaded portion is tightened down at the bracket by a nut. The tightening of the nut serves to tension the element to apply forces against the bracket for drawing the wheel cover toward and tightly against the wheel.

1 Claim, 4 Drawing Figures

U.S. Patent  Dec. 11, 1984  4,487,455
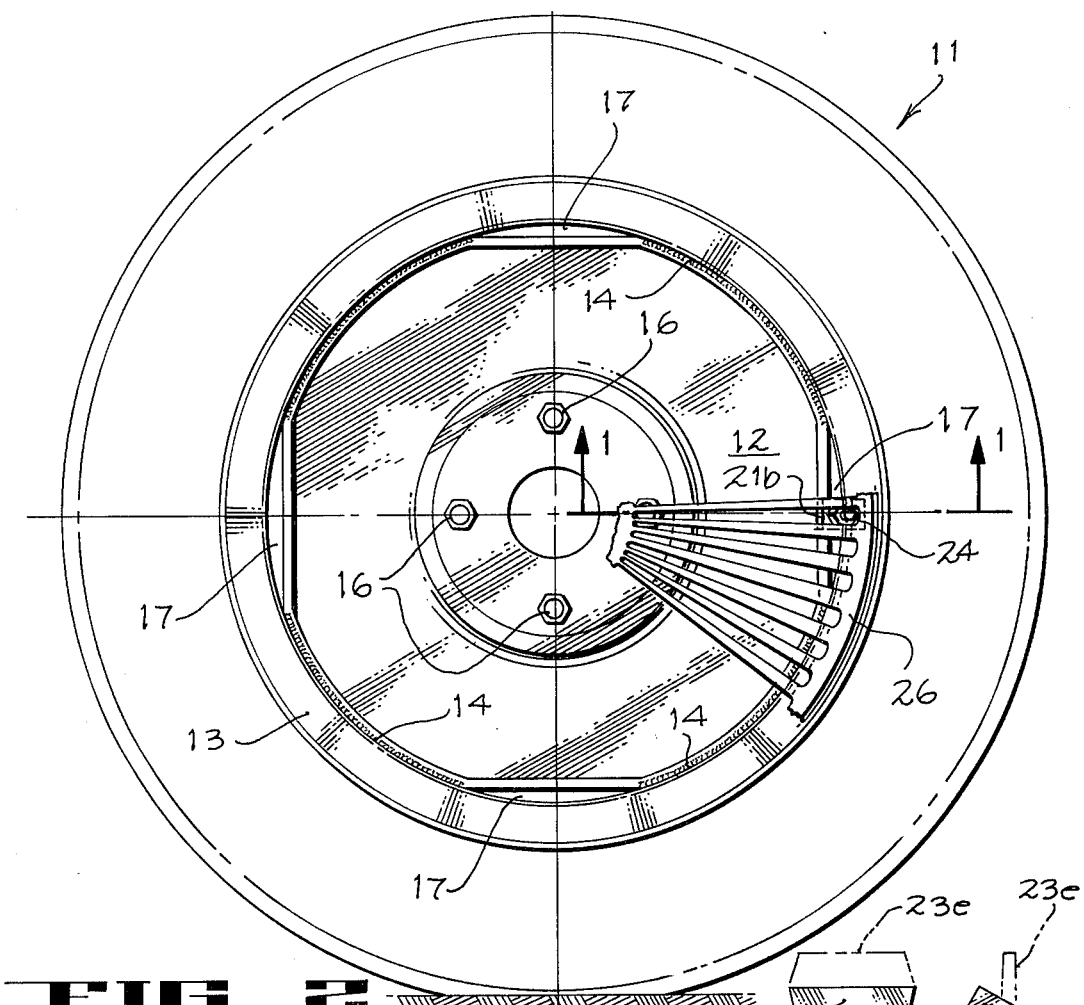
FIG._2
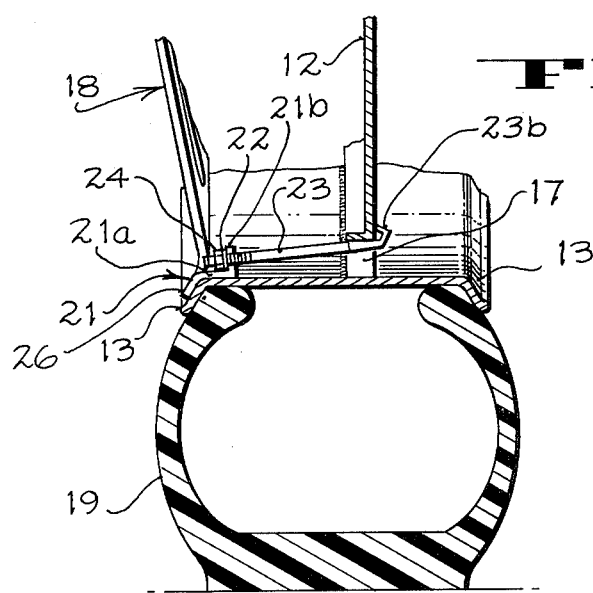
FIG._1
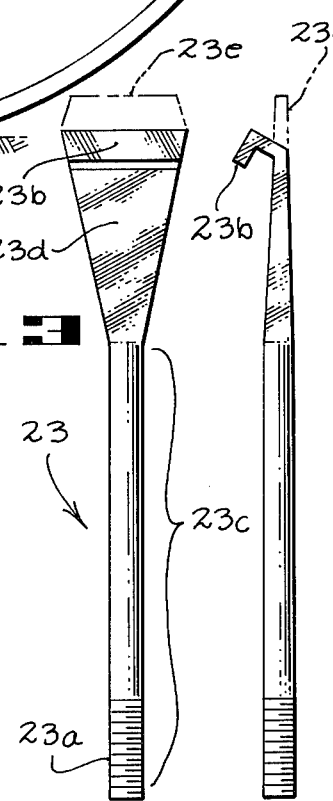
FIG._3
FIG._4

WHEEL COVER RETAINING APPARATUS

This invention pertains to a wheel cover retaining apparatus and more particularly to means for securing wheel covers to vehicle wheels.

Heretofore, vehicle wheel cover locking means have been provided as shown, for example in U.S. Pat. No. 4,090,744, of a type relying upon a uniquely shaped wrench or other key in order to be able to remove the wheel cover from the vehicle wheel. As disclosed herein, however, wheel cover retaining apparatus as provided employs a number of elongate fastening elements holding each given cover to its associated wheel. Accordingly, in order to remove a wheel cover it becomes necessary to unfasten each of the fastening elements whereby the amount of time involved is intended to deter the theft of a wheel cover from a vehicle.

In general, wheel cover retaining means for holding a wheel cover to a wheel having evenly distributed openings defined between the wheel rim and web includes means for adjustably drawing the cover tightly against one side of the wheel. The last named means includes a plurality of brackets carried by and uniformly distributed about the wheel cover to be disposed between the web of the vehicle wheel and the wheel cover. The brackets include a portion disposed at a substantial angle to the rim of the wheel and formed with an opening extending therethrough. An elongate bolt-like element having threads formed on one end and a hook shaped portion on the other is adapted to be disposed through one of the wheel openings with the hook-shaped portion oriented to engage and be held against the back side of the wheel web. in response to tensioning the elements. The threaded end of the elongate element protrudes away from the wheel via the opening in an associated one of the brackets. A nut threaded thereon serves to tension the element to apply forces against the bracket for drawing the wheel cover toward the wheel.

In general it is an object of the present invention to provide an improved wheel cover retaining apparatus.

It is another object of the present invention to provide a wheel cover retaining apparatus of a type wherein ordinary tools can be employed to remove the wheel cover.

It is yet a further object of the invention to provide a wheel cover retaining apparatus wherein a number of securing elements are employed for each wheel cover so that to remove any given wheel cover requires sufficient time to remove the cover to inhibit theft of wheel covers.

The foregoing and other objects of the invention will become more readily evident from the following detailed description of a preferred embodiment when considered in conjunction with the drawings.

FIG. 1 shows an elevation section view transversly of a portion of a wheel and wheel cover as coupled together according to the invention;

FIG. 2 shows a side view of a vehicle wheel;

FIGS. 3 and 4 respectively show plan and side elevation views of an elongate retaining element.

As shown in FIGS. 1 and 2 a vehicle wheel 11 includes a rim 13 and a web 12 spot welded thereto as at locations 14. The central portion of wheel web 12 includes a number of mounting stud openings 16. The shape and dimensions of web 12 are such that a plurality of evenly distributed openings 17 have been defined between rim 13 and web 12. Wheel 11 carries a tire 19.

A wheel cover 18 (such as simulates a wheel with wire spokes) applied to one side of wheel 11 carries means for adjustably drawing the wheel cover tightly against one side of the wheel. Accordingly, a plurality of brackets 21 carried by and uniformly distributed about wheel cover 18 in a manner to be substantially aligned with openings 17, include elongate portions 21a protruding from wheel cover 18 primarily toward web 12 while another portion 21b extends at a substantial angle to portion 21a and includes an opening extending therethrough for receiving the shank of a retaining element 23 therein.

Means forming an elongate bolt-like retaining element 23 includes threads 23a formed on one end and a hook-shaped portion forming a retaining lip 23b formed on the other end.

As shown more particularly in FIGS. 3 and 4 elongate retaining element 23 includes as an integral structure an elongate substantially straight rigid shank portion 23c the end of which includes threads 23a. Threads 23a at one end of portion 23c serve to receive nut 24 thereon. The other end of portion 23c merges into a progressively broadening clip portion 23d. Clip portion 23d gradually tapers in thickness to form a relatively thin, broad end edge margin 23e (shown in phantom lines in FIGS. 3 and 4) whereby edge margin 23e may be curled backwardly to form retaining lip 23b for engaging the back of web 12 as now to be described.

An element 23 associated with each bracket 21 (and disposed in the opening thereof) readily extends into an associated opening 17 with the retaining lip 23b thereof oriented to engage and be held against the back side of web 12. The threaded end protrudes away from the wheel via the opening in its associated bracket 21 to receive nut 24 threaded thereon. Nut 24 serves to tension element 23 to apply axial forces therealong acting against bracket 21 for drawing wheel cover 18 toward the wheel. Preferably a washer 22 should be interposed between nut 24 and bracket portion 21b.

Preferably, the number of brackets 21 should equal the number of openings (17 (such as the four shown) so as to introduce sufficient delay in removing a wheel cover to deter theft of the wheel covers while permitting them to be removed for service with ordinary tools. A flange 26 formed about wheel cover 18 engages rim 13 to establish the maximum inward movement of cover 18 toward web 12.

From the foregoing it will be readily evident that there has been provided an improved means for positively locking a wheel cover to a vehicle wheel in a relatively simple manner while at the same time providing appropriate security against theft of the wheel cover.

Further, mounting of a wheel cover 18 onto a wheel by apparatus of the kind described provides a relatively simple operation involving the mere insertion of retaining elements 23 into their associated openings 17. Accordingly, rotation of retaining elements 23 is not necessarily required by the foregoing orientation. Similarly, all forces are applied along the straight axis of element 23.

From the foregoing it will also be readily evident that only a single nut needs to be employed for each retaining element. Any one of the retaining elements can be tensioned merely by rotating nut 24 while leaving lip 23b engaged with the back of the wheel. Further, by using substantially straight retaining elements they can be tensioned without danger of stretching or elongating the elements. Thus, as arranged, the displacement between nut 24 and lip 23b can be varied to take up any slack which might develop.

I claim:

1. For use in combination with a vehicle wheel of a type having a web and rim, the web being formed to provide evenly distributed openings defined between said rim and web, a wheel covering having a radially outermost edge margin forming a flange therearound, the wheel cover being applied to one side of the wheel, means for adjustably drawing said edge margin of the cover tightly against said one side of the wheel, the last named means comprising a plurality of brackets uniformly distributed about and carried adjacent the inner surface of said flange of the cover, said brackets protruding primarily toward the wheel, said brackets including a radially inwardly extending portion, openings formed through the last named portions adapted to be aligned with the first named openings in a manner to receive elongate fastening means therethrough in spaced parallel relation to each other, elongate fastening means extending through said aligned openings in a substantially spaced parallel relation, a nut carried on the outer end of each said elongate fastening means to apply forces against the outer surface of an associated one of said radially inwardly extending portions of said brackets, the inner end of said elongate fastening means including a broadened portion curled backwardly to form a hook for engaging the back surface of said web to retain said fastening means between said cover and said web by rotating said nut to apply forces against the outer surface of said radially inwardly extending portion of its associated bracket.

* * * * *